(12) United States Patent
Jeon et al.

(10) Patent No.: US 7,625,665 B2
(45) Date of Patent: Dec. 1, 2009

(54) SECONDARY BATTERY MODULE AND END-PLATE USED IN THE SAME

(75) Inventors: Yoon-Cheol Jeon, Suwon-si (KR); Tae-Yong Kim, Suwon-si (JP)

(73) Assignee: Samsung SDI Co., Ltd., Suwon-si (KR)

( * ) Notice: Subject to any disclaimer, the term of this patent is extended or adjusted under 35 U.S.C. 154(b) by 746 days.

(21) Appl. No.: 11/273,930

(22) Filed: Nov. 14, 2005

(65) Prior Publication Data
US 2006/0115719 A1 Jun. 1, 2006

(30) Foreign Application Priority Data
Nov. 30, 2004 (KR) .................. 10-2004-0099321
Mar. 10, 2005 (KR) .................. 10-2005-0020002

(51) Int. Cl.
*H01M 2/10* (2006.01)
(52) U.S. Cl. .................... 429/157; 429/159
(58) Field of Classification Search .......... 429/157, 429/158, 159
See application file for complete search history.

(56) References Cited

U.S. PATENT DOCUMENTS

| | | | | |
|---|---|---|---|---|
| 3,664,877 A | * | 5/1972 | Shaw | 429/159 X |
| 4,883,725 A | * | 11/1989 | Gerard | 429/159 X |
| 5,409,787 A | * | 4/1995 | Blanyer et al. | 429/159 X |
| 6,709,783 B2 | * | 3/2004 | Ogata et al. | 429/157 X |
| 7,074,517 B2 | * | 7/2006 | Higashino | 429/157 X |

FOREIGN PATENT DOCUMENTS

| | | |
|---|---|---|
| JP | 8-303682 | 11/1996 |
| JP | 9-120808 | 5/1997 |
| JP | 2000-067899 | 3/2000 |
| JP | 2000-149900 | 5/2000 |
| JP | 2002-203527 | 7/2002 |

OTHER PUBLICATIONS

Patent Abstracts of Japan, Publication No. 08-303682; Date of Publication: Nov. 22, 1996; in the name of Hiroshi Yamazaki et al.
Patent Abstracts of Japan, Publication No. 09-120808; Date of Publication: May 6, 1997; in the name of Hiroshi Inoue et al.
Patent Abstracts of Japan, Publication No. 2000-149900; Date of Publication: May 30, 2000; in the name of Isao Imon et al.
Patent Abstracts of Japan, Publication No. 2002-203527; Date of Publication: Jul. 19, 2002; in the name of Gouhan Tsuchiya et al.

* cited by examiner

*Primary Examiner*—Stephen J. Kalafut
(74) *Attorney, Agent, or Firm*—Christie, Parker & Hale, LLP

(57) ABSTRACT

A secondary battery module includes unit batteries arranged adjacent to each other in a battery group, the battery group having outermost surfaces. A first end-plate is disposed on one of the outermost surfaces, and a second end-plate disposed on another of the outermost surfaces. A connection rod is fixed to the first end-plate and the second end-plate through fastening members. A thickness of the first end-plate is smaller than a thickness of the first fastening member.

20 Claims, 8 Drawing Sheets

SECONDARY BATTERY MODULE AND END-PLATE USED IN THE SAME

CROSS-REFERENCE TO RELATED APPLICATIONS

This application claims priority to and the benefit of Korean Patent Application No. 10-2004-0099321 filed with the Korean Intellectual Property Office on Nov. 30, 2004, and Korean Patent Application No. 10-2005-0020002 filed with the Korean Intellectual Property Office on Mar. 10, 2005, the entire contents of which are incorporated herein by reference.

BACKGROUND OF THE INVENTION

1. Technical Field

The present invention relates to a secondary battery, and more particularly, to a battery module that is constructed by connecting a plurality of unit batteries to each other.

2. Related Art

Unlike a primary battery that cannot be charged, a secondary battery is rechargeable. Secondary batteries have been manufactured in various shapes, for example, a cylindrical shape, a square shape, or the like.

A secondary battery having a small capacity is used as a power source for various portable small-sized electronic apparatuses such as cellular phones, notebook computers, and camcorders. A secondary battery having a large capacity is commonly used as a motor driving power source for hybrid vehicles or the like.

A plurality of secondary batteries each having a high output are commonly connected in series to each other to constitute a secondary battery having a large capacity capable of being used in driving motors, such as apparatuses requiring a large power, for example, an electric vehicle or the like.

As such, one secondary battery having a large capacity (hereinafter, simply referred to as a battery module throughout the specification) is composed of a plurality of secondary batteries (hereinafter, simply referred to as unit batteries throughout the specification) connected in series to each other.

Each unit battery includes an electrode assembly in which an anode plate and a cathode plate are laminated with a separator interposed therebetween, a case having a space in which the electrode assembly is disposed, a cap assembly which is coupled with the case so as to shield the case, and anode and cathode terminals which are electrically connected to collectors of the anode and cathode plates which protrude toward the cap assembly and are provided in the electrode assembly.

The plurality of unit batteries are disposed in a line, conductors are connected between the cathode and anode terminals of adjacent unit batteries through nuts, and the battery module is formed.

In the above-mentioned battery module, several to several tens of unit batteries are connected to each other to constitute one battery module. Therefore, an end-plate is used to fix the laminated unit batteries.

The end-plates are located at the outermost sides of the laminated unit batteries, are fastened by the connection rods and the nuts, and are tightened up. The unit batteries are fixed between the end-plates. According to this structure, the end-plate is applied with strong stress by the nut.

If the end-plate is formed using a high strength material in order to ensure the strength of the end-plate, a manufacturing cost of the end-plate and the battery module increases. For this reason, the thickness of the end-plate is typically increased to increase the strength of the end-plate, so that deformation or destruction of the end-plate is prevented.

However, if the thickness of the end-plate is increased, the total weight of the battery module is increased, so that the performance of an apparatus on which the battery module is mounted is lowered.

It may be beneficial to decrease the weight of secondary batteries for driving motors used in apparatuses such as a hybrid electric vehicle (HEV), a motor bicycle, a motor scooter or the like in order to improve the performance of the apparatuses. However, according to the related art, there is a problem in that the weight of the battery module is increased and the output of the battery module is decreased, so that these battery modules are typically not used for driving such motors.

SUMMARY OF THE INVENTION

Accordingly, some embodiments of the invention minimize the weight of a battery module and an end-plate used in a battery module.

By increasing strength of a portion of an end-plate where stress is concentrated, a weight of the battery module can be decreased and it is possible to prevent the end-plate from being deformed or destroyed due to the stress.

According to an aspect of the invention, a secondary battery module includes unit batteries arranged adjacent to each other in a battery group, the battery group having outermost surfaces. A first end-plate is disposed on one of the outermost surfaces, and a second end-plate disposed on another of the outermost surfaces. A connection rod is fixed to the first end-plate and the second end-plate through fastening members. A thickness of the first end-plate is smaller than a thickness of the first fastening member.

The thickness of the end-plate can thus be reduced and the weight of the battery module can be minimized.

In one embodiment, the end-plate is formed such that it has a minimum thickness to endure applied stress while pressing the unit batteries together so that they are disposed closely to each other.

Further, in a battery module, battery barrier ribs are provided between unit batteries such that a predetermined interval is maintained between the unit batteries and a cooling medium circulates therebetween.

The outermost surfaces may be disposed on a laminated unit battery or a barrier rib.

Fastening members may be formed so as to protrude at side ends of an end-plate opposite to each other, and locations where the fastening members are formed may be central portions of the side ends of the end-plate or at the front ends. In one embodiment, the front surface of the end-plate can give pressure to the unit batteries uniformly. The location and number of the fastening members may vary.

The fastening members may be located at both sides and the top and bottom surfaces of the unit battery in a state in which a terminal provided at the unit battery faces upward.

The front surface of the fastening member may be provided with a hole through which the connection rod passes.

The connection rod may be of a bolt-type and fastened by fastening nuts to screw threads formed at ends of the connection rod.

A connection portion between the end-plate and the fastening member may have a circular-arc cross section.

Accordingly, in various embodiments, tension applied to the connection unit may be uniformly dispersed, so that it is possible to prevent the fastening member from being destroyed or deformed due to the concentrated tension.

In one embodiment, the end-plate has a flat plate member which has a size corresponding to a size of a side of the square unit battery and comes into contact with the side of the unit battery. Fastening members are formed so as to protrude at upper and lower ends of the flat plate member. Each fastening member has a front surface where a through hole is formed. In addition, the flat plate member has a smaller thickness than the fastening member.

In one embodiment, in the end-plate, a connection portion between the flat plate member and the fastening member has a circular-arc cross section.

In one embodiment, a portion of the end plate where tension is concentrated is formed of a material having large strength.

According to another aspect of the invention, a secondary battery module includes: a plurality of unit batteries; end-plates each of which is disposed at an outermost side of a battery group in which the plurality of unit batteries are laminated; connection rods which are inserted in the end plates, and nuts that fasten the connection rods to the end plates.

The end-plate includes has a flat plate member which presses a unit battery. Fastening members are provided at two front ends of the flat plate member opposite to each other. Holes are formed at a center of the fastening members through which the connection rod passes. Hole peripheral portions are located at a periphery of the holes and a force applied to the hole peripheral portions by the nut.

The connection rod is coupled with the nut, the fastening member is tightened up such that the flat plate member gives pressure the battery group, and strong stress is given to the hole peripheral portion by the nut. In addition, the force given to the hole peripheral portion is transmitted to the fastening member and toward the inside of the battery group.

In one embodiment, the fastening member, which is applied with relatively strong stress, is formed using a material having greater tensile strength than the flat plate member. Likewise, the hole peripheral portion where the force is directly applied by the nut may be formed using a material having greater tensile strength than the flat plate member. In one embodiment, the hole peripheral portion may be formed using a material having greater tensile strength than the fastening member.

Various secondary battery modules according to the present invention can be used as an energy source for driving motors in apparatuses such as an HEV, an electric vehicle (EV), a wireless cleaner, a motor bicycle, a motor scooter or the like, which are operated using the motor, but the invention is not limited thereto.

BRIEF DESCRIPTION OF THE DRAWINGS

These and/or other aspects and features of embodiments of the invention will become apparent and more readily appreciated from the following description of examples of embodiments, taken in conjunction with the accompanying drawings in which.

DESCRIPTION OF THE EMBODIMENTS

Hereinafter, examples of embodiments of the invention will be described in detail with reference to the accompanying drawings such that they can easily be made and used by those skilled in the art. However, the invention is not limited to the examples of embodiments described, but can be embodied in various forms.

Figure 1:
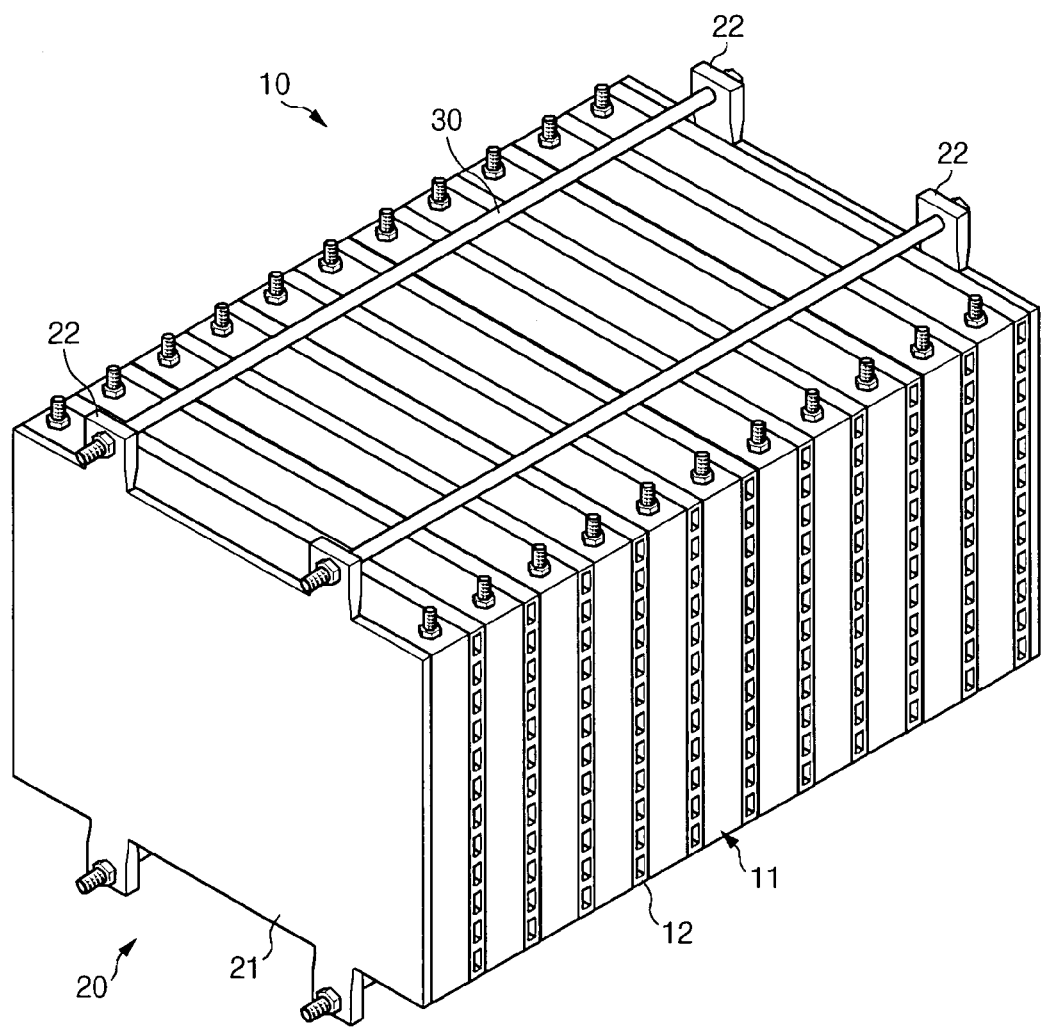
FIG. 1 is a perspective view showing a structure of a secondary battery module according to an embodiment of the present invention.

Referring to FIG. 1, a battery module 10 according to the present embodiment is a battery module having a large capacity, and includes a plurality of unit batteries 11 which are continuously disposed at a predetermined interval.

In the examples of embodiments described below, each unit battery 11 is a square unit battery, but the invention is not limited thereto.

In this embodiment, the square secondary battery includes unit batteries 11, each having an electrode assembly in which an anode plate and a cathode plate are laminated with a separator interposed therebetween. The secondary battery has a structure in which a predetermined amount of power is charged and discharged.

Battery barrier ribs 12 are provided between the unit batteries 11 such that a gap between the unit batteries 11 is maintained and a cooling medium circulates between the unit batteries 11.

Accordingly, the plurality of unit batteries 11 are continuously disposed in a state in which they are spaced apart from each other at a predetermined interval by the battery barrier ribs 12 disposed between the unit batteries to constitute a battery group.

A pair of end-plates 20 are closely adhered to external surfaces of the unit batteries 11 located at the outermost sides of the unit batteries 11 constituting the battery group, and the battery group is fixed by connection rods 30 for connecting the end-plates 20 to form one battery module 10.

Figure 2:
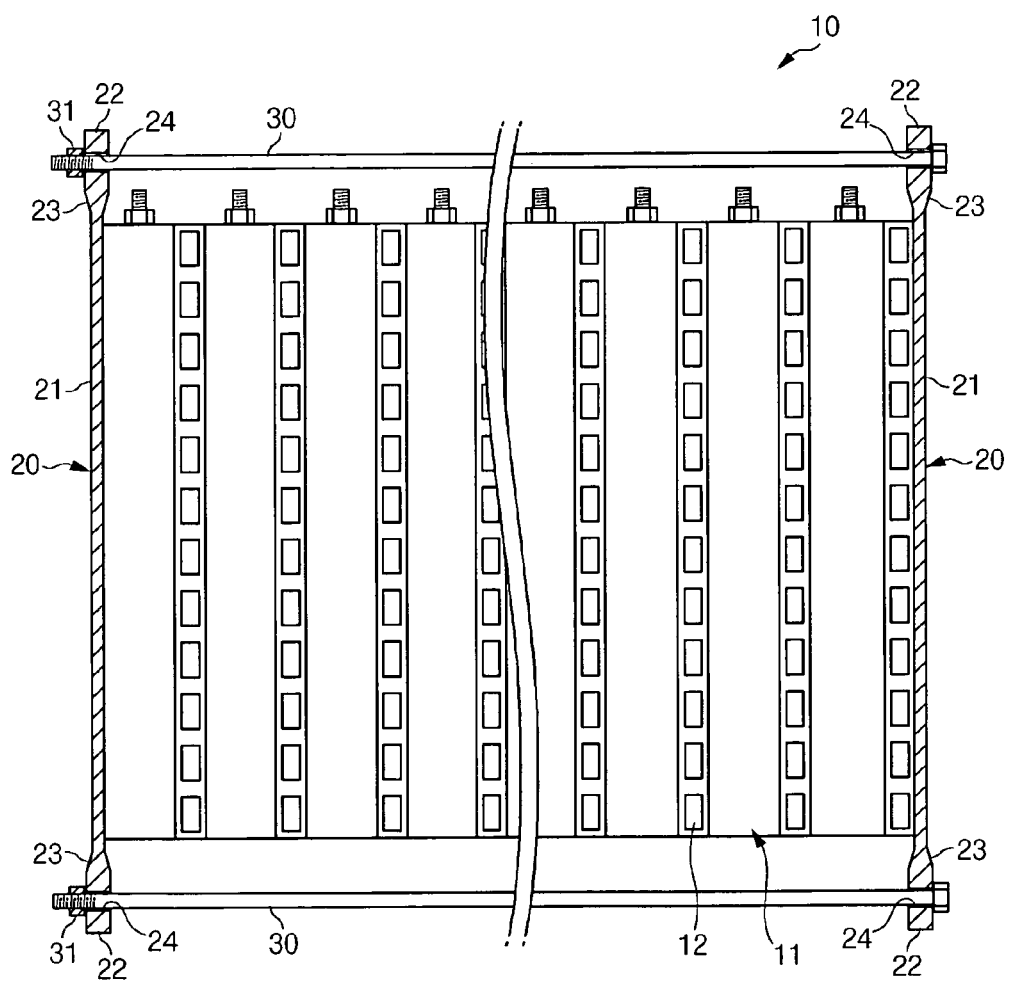
FIG. 2 is a schematic lateral cross-sectional view of the secondary battery module shown in FIG. 1.

As shown in FIG. 2, the end-plate 20 has a size corresponding to a size of a front surface of the unit battery 11, and includes a flat plate member 21 which is disposed closely to the front surface of the unit battery and fastening members 22 which are formed integrally at upper and lower ends of the flat plate member 21 and protrude toward the outside of the flat plate member 21.

Hereinafter, the upper end of the flat plate member 21 is defined as a front end corresponding to an upper side of the unit battery in a state in which a terminal which is provided in the unit battery 11 and protrudes toward the outside is disposed toward an upper side from the paper, and the lower end of the flat plate member 21 is defined as a front end corresponding to a lower side of the unit battery.

An installation structure of the fastening member 22 and the connection rod 30 will be described in more detail. A hole 24 in which the connection rod 30 is inserted is formed in the front surface of the fastening member 22. The connection rod 30 is a bolt type, and has screw threads formed on its front end. The connection rod 30 passes through the hole 24 of the fastening member 22 and is fastened to the fastening member 22 through a nut 31.

In this way, if the connection rod 30 passes through the hole 24 of the fastening member 22 and is fastened to the fastening member 22 through the nut 31, the unit batteries are tightened and fixed by the end-plates 20 provided at both sides of the battery group.

Figure 3:
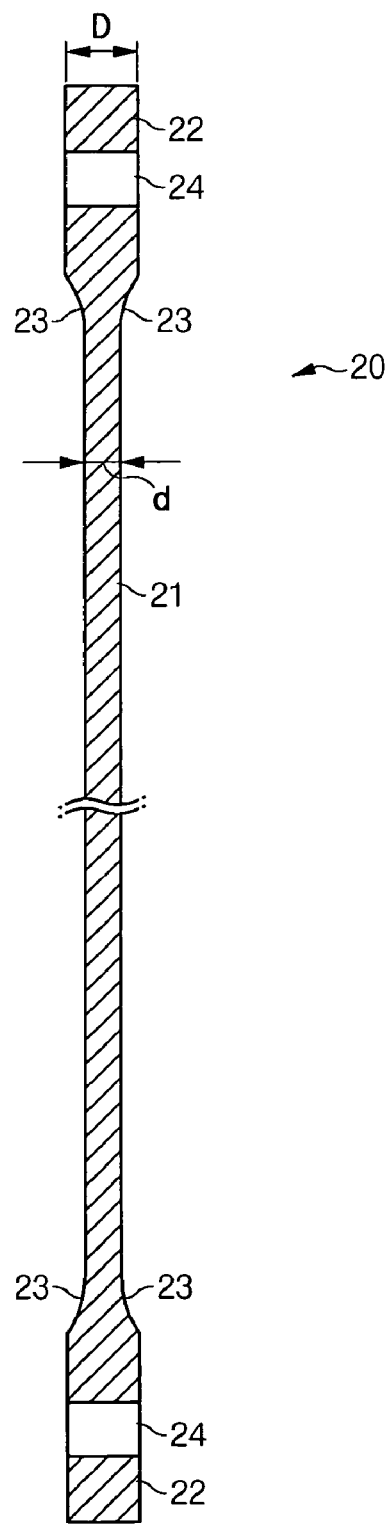
FIG. 3 is a cross-sectional view showing a structure of an end-plate of the secondary battery module shown in FIGS. 1 and 2.

As shown in more detail in FIG. 3, a thickness d of the flat plate member 21 is smaller than a thickness D of the fastening member 22. The connection rod 30 is mounted in the fastening member 22, where stress is generated. Thus, the thickness D of the fastening member 22 is increased, so that rigidity against the stress is ensured. In addition, the thickness d of the flat plate member 21 is minimized, so that the weight of the end-plate 20 is reduced. In this way, the weight of the battery module 10 is minimized.

Accordingly, the fastening force of the unit batteries 11 can be increased, which results in the light weight of the battery module 10.

In addition, as shown in FIG. 3, the connection portion 23 between the flat plate member 21 and the fastening member 22 of the end-plate 20 has a structure in which it has a circular-arc cross section toward the inside along the thick-wise direction so as to become concave toward the inside.

Accordingly, the end-plate 20 and the fastening members 22 are smoothly connected to each other without depending on the difference between the end-plate 20 and the fastening member 22 in thickness. In addition, the stress applied to the connection portion 23 is dispersed over the entire connection portion 23 having the arc shape, so that it is possible to prevent the connection portion 23 from being cut due to the stress concentration.

Figure 4:
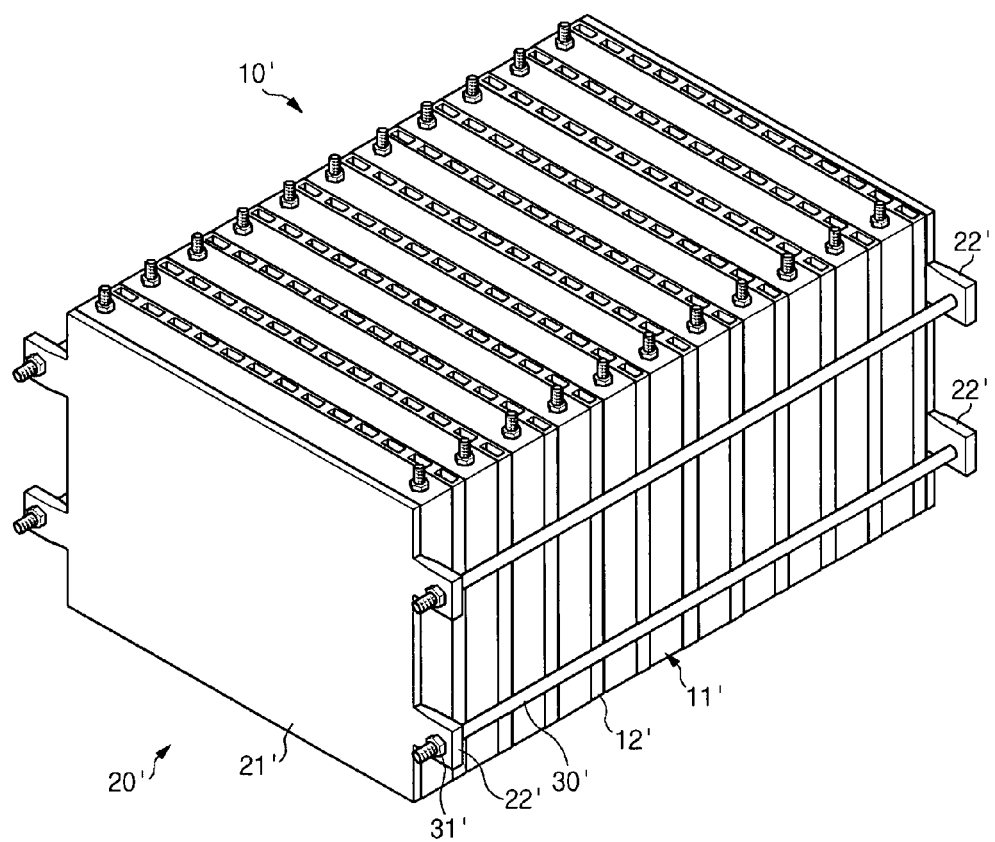
FIG. 4 is a perspective view showing a structure of a secondary battery module according to another embodiment of the present invention.

According to another embodiment of the battery module 10', as shown in FIG. 4, the fastening members 22' protrude at both side ends of the flat plate member 21', and the connection rods 30' extend through the fastening member 22' to be fastened with a nut 31'.

In this embodiment, the side ends of the flat plate member 21' are defined as front ends corresponding to left and right sides of the outside unit batteries in a state in which the terminals of each unit battery 11 are disposed toward the upper side of FIG. 4.

The remainder of the structure of the end plate 20' and the battery module 10' is the same as that of the embodiment illustrated in FIGS. 1-3, except for locations where the fastening members 22' are formed on the flat plate member 21'. Reference numerals not shown in FIG. 4 are the same as those described in relation to FIGS. 1-3, and the further description thereof will be omitted.

Referring to FIGS. 1-4, the operation of the battery module 10, 10' having the above-mentioned structure will now be described.

The plurality of unit batteries 11 and the battery barrier ribs 12 disposed between the plurality of unit batteries 11 are laminated in a line and constitute a battery group. The end-plates 20, 20' according to these embodiments are respectively disposed on the unit batteries 11 of the outermost sides among the unit batteries 11 of the battery group.

In this state, the connection rod 30, 30' passes through a hole 24 of the fastening member 22, 22' that is formed so as to protrude at the end-plate 20, 20'. Further, the nut 31, 31' is fastened to the front end of the connection rod 30, 30' which protrudes toward the outside of the fastening member 22, 22' of the end-plate 20, 20' through the hole 24, so that the battery group is tightened up. As a result, the plurality of unit batteries 11 and the battery barrier ribs 12 can be integrally fixed to each other.

As the fastening member 22, 22' assembled in this way is tightened inwardly by the connection rod 30, 30' and the nut 31, 31', tension is applied to the connection portion 23 between the end-plate 20, 20' and the fastening member 22, 22'. However, the stress applied to the connection portion 23 is dispersed over the entire connection portion 23 having the arc shape, so that the stress is not concentrated on one location.

Figure 5:
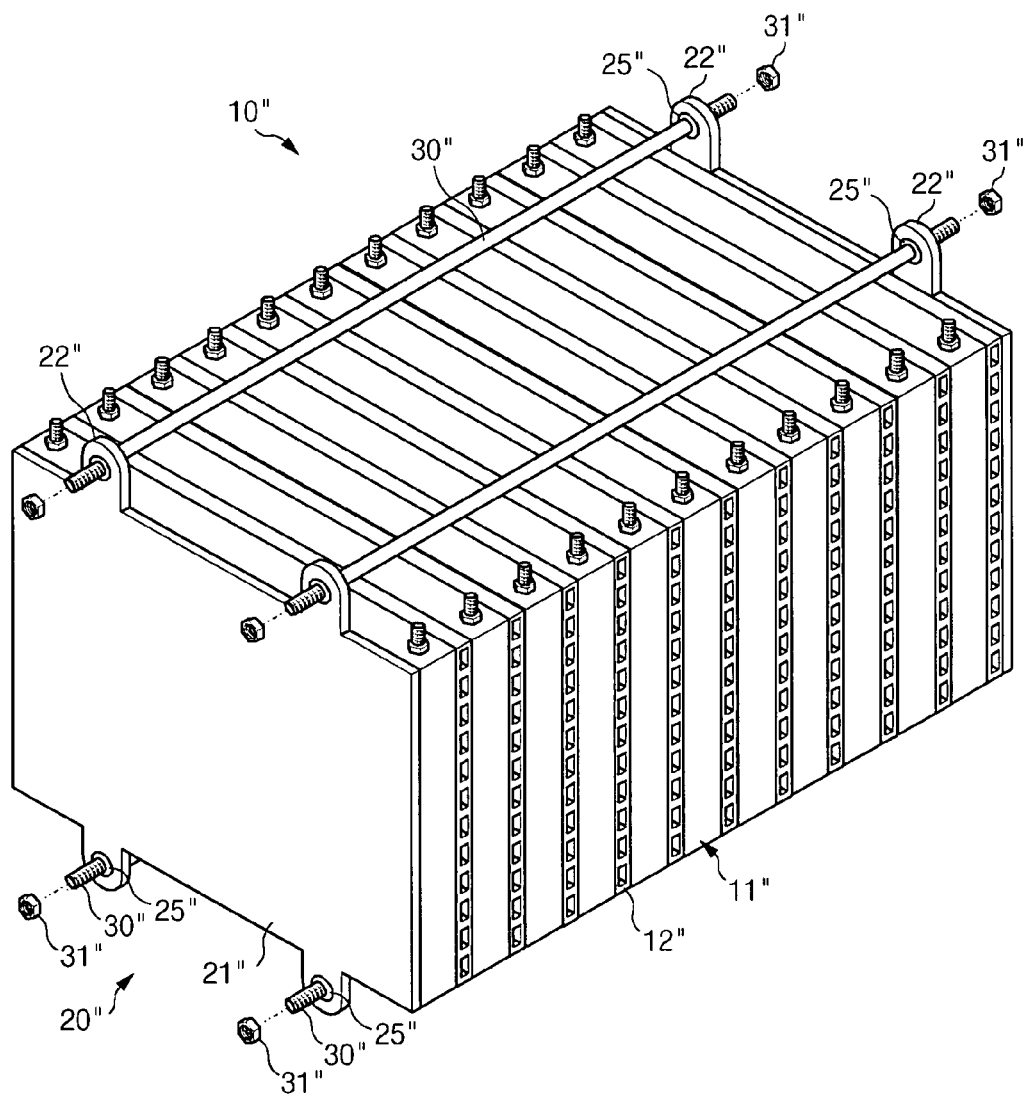
FIG. 5 is an exploded perspective view showing a structure of a secondary battery module according to another embodiment of the present invention.
Figure 6:
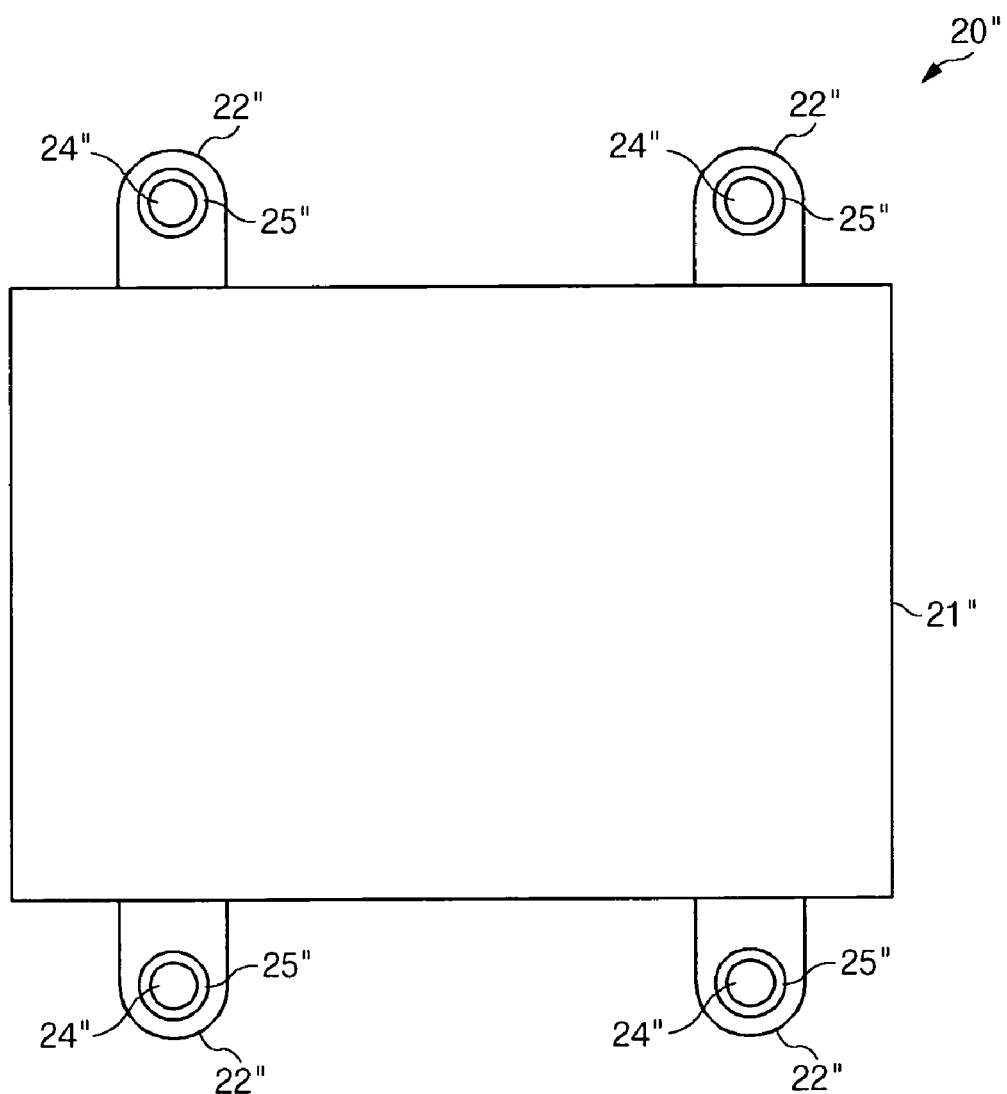
FIG. 6 is a front view showing a structure of an end-plate of the secondary battery module shown in FIG. 5.

Referring to FIGS. 5 and 6, an end-plate of a battery module 10'' according to another embodiment will be described. The end-plate 20'' includes a flat plate member 21'' which is disposed closely to the unit battery 11 and fastening members 22'' that are provided at upper and lower ends of the flat plate member 21''. Each of the fastening members 22'' has a hole 24'' which is formed at a center thereof. Each of the holes 24'' is formed at a center of the fastening member, through which the connection rod is inserted, and hole peripheral portions 25''.

The end-plate 20'' according to the present embodiment is formed to have a smaller thickness than end-plates in the related art. The fastening member 22'' is formed of a material having greater strength than the flat plate member 21''. In addition, the hole peripheral portion 23'' is formed of a material having greater strength than the flat plate member 21''.

In one embodiment, the hole peripheral portion 25'' is formed of a material having greater strength than the fastening member 22''.

A method of bonding different materials whose strengths are different from each other is not particularly limited. For example, the different materials can be bonded using various known methods using the composite steel, the clad steel or the like.

Accordingly, in the end-plate 20'' according to this embodiment, a material having greater strength than an existing end-plate 20'' formed of a steel plate is used in a portion where the stress is concentrated. As a result, even though the thickness of the end-plate 20'' is reduced, it can endure the stress applied by the nut 31'' and the connection rod 30''.

In the present embodiment, in a case in which the flat plate member 21'' of the end-plate 20'' is made of a steel plate which is inexpensive and has tensile strength of 100 MPa, the fastening member 22'' may be formed of aluminum alloy 3003 which has the tensile strength of 150 MPa and is in accordance with Japanese Industrial Standard (JIS). The hole peripheral portion 25'' may be formed of stainless steel 304 which has the tensile strength of 300 Mpa and is in accordance with Korean Industrial Standard (KS).

As in the above-mentioned embodiments, when the portion where the tension is concentrated is formed using a material having large tensile strength and shear strength, the thickness of the end-plate 20'' can be decreased to a range of ⅓ to ½ of the normal thickness of end-plates in the related art.

Figure 7:
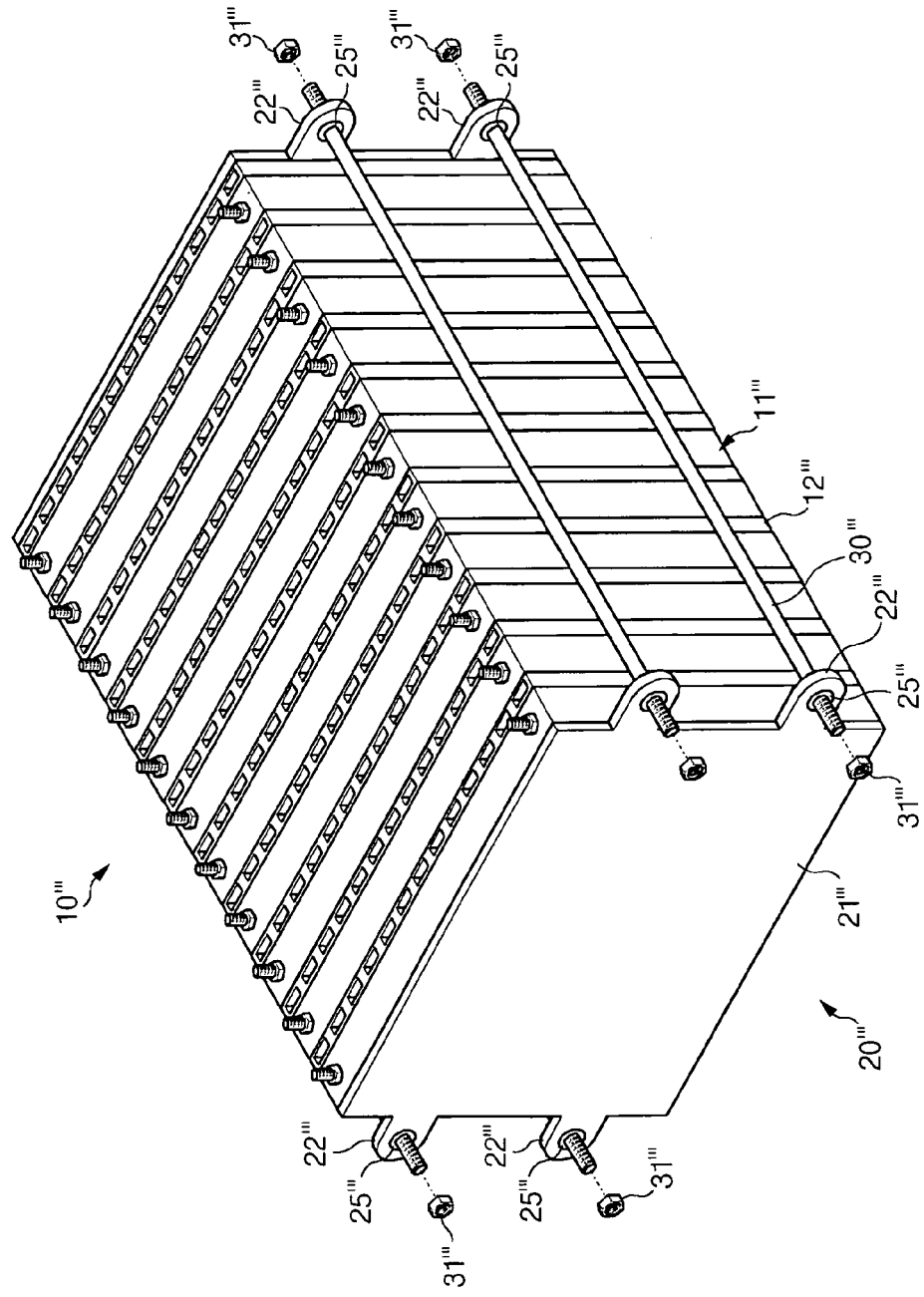
FIG. 7 is an exploded perspective view showing a structure of a secondary battery module according to yet another embodiment of the present invention.

As described above, the fastening members 22'', 22''' can be formed not only at the upper and lower ends of the flat plate member 21'' but also at both side ends of the flat plate member 21''', as shown in FIG. 7.

In the embodiments shown in FIGS. 5-7, if the end-plates 20'', 20''' tighten up the battery group and the battery group is fixed, the nut 31'', 31''' fastened to the connection rod 30'', 30''' directly gives pressure to the hole peripheral portion 25'', 25'''. At this time, since the hole peripheral portion 25'', 25''' is formed of a material having strength that can sufficiently endure the pressure tension, the end-plates 20'', 20''' is not easily deformed or destroyed due to the pressure tension.

In addition, since the tension applied to the hole peripheral portion 25", 25''' is transmitted to the fastening member 22", 22''', the tension is applied from the portion coming in contact with the hole peripheral portion 25", 25''' toward the inside of the battery.

At this time, since the fastening member 22", 22''' is formed of a material having greater strength than steel material, it can endure the pressure tension. The fastening member 22", 22''' transmits the tension to the flat plate member 21", 21''' such that the flat plate member 21", 21''' gives pressure to the unit batteries sufficiently toward the inside.

Accordingly, the secondary battery module 10", 10''' can be more stably bonded, and it is possible to prevent the end-plate 20", 20''' from being deformed and destroyed due to the applied stress.

In addition, the weight of the end-plate 20", 20''' is decreased, so that it is possible to improve the performance of an apparatus on which the battery module is mounted.

Figure 8:
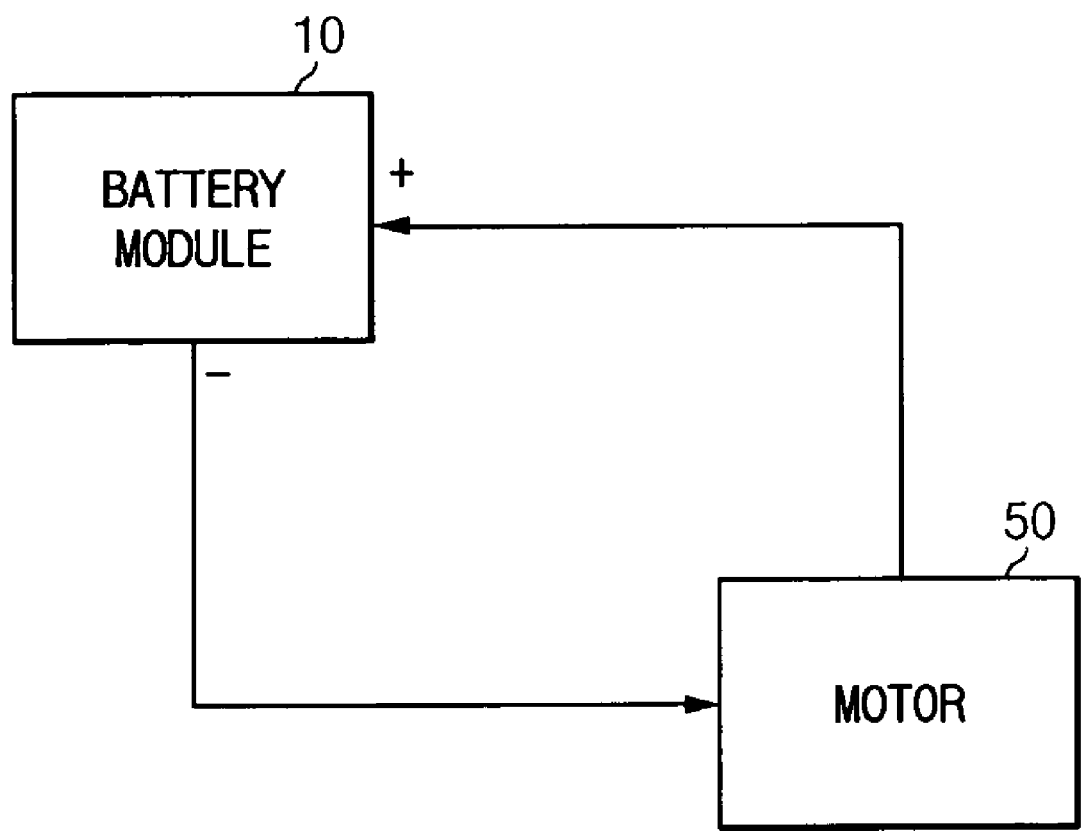
FIG. 8 is a schematic block diagram showing a secondary battery module driving a motor according to an embodiment of the present invention.

FIG. 8 is a schematic block diagram of a secondary battery module 10, as discussed above, driving a motor 50.

According to the described embodiments of the present invention, the weight of the battery module can be reduced, so that its output can be increased.

In addition, the stress occurring when the unit battery is fastened is dispersed, so that it is possible to prevent the battery module from being destroyed due to the stress concentration, which results in an increase in the reliability of the battery module.

The battery module according to the present invention can be effectively used as a battery for driving motors in apparatuses such as HEVs, EVs, wireless cleaners, motor bicycles, motor scooters, or the like, where a high output/large capacity is required. However, the invention is not limited to these applications.

Although the present invention has been described in detail hereinabove in connection with examples of embodiments thereof, it should be understood that the invention is not limited to the disclosed exemplary embodiments. It will be apparent to those skilled in the art that various modifications and changes can be made in the present invention without departing from the spirit or scope of the invention as defined in the appended claims and their equivalents.

What is claimed is:

1. A secondary battery module comprising:
   unit batteries in a battery group, the battery group having outermost surfaces;
   a first end-plate on one of the outermost surfaces, the first end-plate having first integral fastening members, at least one of the first integral fastening members having a thickness greater than a thickness of the first end plate;
   a second end-plate on another of the outermost surfaces, the second end-plate having second integral fastening members, at least one of the second integral fastening members having a thickness greater than a thickness of the second end-plate; and
   a connection rod fixed to the first end-plate and the second end-plate through the first and second integral fastening members.

2. The secondary battery module of claim 1, wherein at least one of the outermost surfaces is on a laminated unit battery.

3. The secondary battery module of claim 1, further comprising a barrier rib adjacent at least one corresponding unit battery.

4. The secondary battery module of claim 3, wherein the first end-plate or the second end-plate is on a barrier rib.

5. The secondary battery module of claim 1, further comprising terminals extending from the unit batteries in a first direction,
   wherein the first end-plate further comprises a flat plate member contacting one of the outermost surfaces and having an area substantially corresponding to an area of the one of the outermost surfaces, and
   wherein at least two of the first integral fastening members protrude in the first direction from opposite peripheral edges of the flat plate member and have a surface including a through hole.

6. The secondary battery module of claim 1, wherein the secondary battery module has a top edge, a bottom edge, and opposing side edges, the secondary battery module further comprising terminals extending from the top edge of the secondary battery module, and wherein at least two of the first integral fastening members protrude from the first end-plate on the opposing side edges.

7. The secondary battery module of claim 1, further comprising terminals extending from the unit batteries in a first direction, wherein at least two first integral fastening members protrude in the first direction from the first end-plate.

8. The secondary battery module of claim 1, wherein the connection rod includes screw threads and wherein a fastening nut is attached to each screw thread.

9. The secondary battery module of claim 1, wherein the first integral fastening members each include a connection portion having a substantially circular-arc cross-section.

10. The secondary battery module of claim 1, wherein the battery module drives a motor.

11. The secondary battery module of claim 1, wherein the first end-plate has a first peripheral edge and the first integral fastening members protrude in their entirety from the first peripheral edge; and
   wherein the second end-plate has a second peripheral edge and the second integral fastening members protrude in their entirety from the second peripheral edge.

12. A secondary battery module comprising:
   unit batteries laminated in a battery group, the battery group having outermost surfaces;
   end-plates, each end-plate comprising a flat plate member adjacent to one of the outermost surfaces of the battery group and integral fastening members on the flat plate member, the integral fastening members having a greater tensile strength than the flat plate member, and the integral fastening members having a hole; and
   a connection rod and a nut fastening the end-plates to each other through the hole of the integral fastening members such that stress is concentrated at the integral fastening members of the end-plates,
   wherein each integral fastening member comprises a portion at a periphery of the hole having a greater strength than other portions of the integral fastening member.

13. The secondary battery module of claim 12, wherein the integral fastening members comprise a material having a greater strength than the flat plate member of the end-plate.

14. The secondary battery module of claim 12, wherein the portion at a periphery of the hole is proximate to the connection rod and the nut.

15. The secondary battery module of claim 12, wherein a material at the portion at the periphery of the hole has a greater strength than a material of the flat plate member.

16. The secondary battery module of claim 15, wherein a material at the portion at the periphery of the hole has a greater strength than a material at other portions of the integral fastening members.

17. The secondary battery module of claim 12, wherein the integral fastening members comprise aluminum 3003.

18. The secondary battery module of claim 15, wherein the material at the portion at the periphery of the hole comprises stainless steel 304.

19. The secondary battery module of claim 12, wherein the secondary battery module has a top edge, a bottom edge, and opposing side edges, the secondary battery module further comprising terminals extending from the top edge of the secondary battery module, and wherein at least two of the integral fastening members protrude from at least one of the end-plates on the opposing side edges.

20. The secondary battery module of claim 12, further comprising terminals protruding from the unit batteries in a first direction, wherein the integral fastening members protrude in the first direction from at least one of the end-plates.

* * * * *

UNITED STATES PATENT AND TRADEMARK OFFICE
CERTIFICATE OF CORRECTION

PATENT NO.      : 7,625,665 B2
APPLICATION NO. : 11/273930
DATED           : December 1, 2009
INVENTOR(S)     : Jeon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this

Second Day of November, 2010

David J. Kappos
*Director of the United States Patent and Trademark Office*